May 28, 1963 E. H. NAZARE 3,091,754

ELECTRIC MEMORY DEVICE

Filed May 8, 1958 2 Sheets-Sheet 1

INVENTOR.
EDGAR HENRI NAZARE

BY Imirie and Smiley

ATTORNEYS.

May 28, 1963 E. H. NAZARE 3,091,754

ELECTRIC MEMORY DEVICE

Filed May 8, 1958 2 Sheets-Sheet 2

INVENTOR.
EDGAR HENRI NAZARE

BY Laurie and Smiley

ATTORNEYS.

United States Patent Office
3,091,754
Patented May 28, 1963

3,091,754
ELECTRIC MEMORY DEVICE

Edgar Henri Nazare, 14 Rue Duc des Cars, Algiers, Algeria

Filed May 8, 1958, Ser. No. 733,970
2 Claims. (Cl. 340—173)

This invention relates generally to memory devices and more particularly to an improved device comprising a matrix of spark discharge cells, individual cells of which may be conditioned by a higher read-in potential to permit later passage of a spark upon application of a lower read-out potential.

Memory devices for recording a binary code, available for subsequent information, and usable in computers and the like are well known. Such known devices usually comprise magnetic tapes, or drums, or cards provided with conducting paths interrupted at appropriate points by evaporation of the conducting material upon application of recording potentials. The known devices are subject to certain disadvantages including complexity, bulkiness and necessity for complex associated apparatus of mechanical, electro-mechanical or electromagnetic character to perform the recording and reading-out functions.

In the instant invention, these disadvantages are obviated by provision of a matrix of spark discharge cells, each cell having a pair of spaced electrodes separated by a dielectric normally impervious to the read-out potential. The dielectric is, however, capable of modification by a recording potential to permit later passage of a spark discharge between the electrodes upon application of the subsequent read-out potential. The resultant matrix permits the packaging of a very large number of cells in a very small space, the use of simple auxiliary apparatus for read-in and read-out, and ease and economy of fabrication.

Accordingly, it is a primary object of the present invention to provide a new and improved memory device which obviates the disadvantages of known devices.

Another object of the invention is to obtain a memory block or matrix of very great capacity in a small space.

A further object of the invention is to achieve an electric memory device utilizing a plurality of spark discharge cells so arranged in a matrix as to permit ready access or recording and read-out potentials to individual cells.

A still further object of the invention is to provide an electric memory device of the indicated character in which each cell comprises a pair of electrodes separated by a dielectric which may be modified by a higher recording potential to permit the passage of a spark between the electrodes and across the dielectric upon application of a lower read-out potential.

Yet another object of the invention is to provide an electric memory device of the indicated character in which the discharge cell is so constructed as to limit the path of travel of the spark and compel the spark to take the shortest path between the electrodes.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

According to the invention, the electric memory device, shown in several embodiments in FIGS. 1–7, essentially comprises as its basic element a spark discharge cell placed in each of the information circuits. Each cell includes a dielectric between spaced terminals, or electrodes, across which a spark or ionization current is set up enabling the information circuit to be closed. The dielectric of the cell is normally impervious to read-out potentials until it has been modified or conditioned by a recording potential. The electrodes of individual cells are each connected in sets in such manner as to enable each impulse point to be referenced by co-ordinates.

Preferably, the cell electrodes belonging to one of the sets are arranged and connected in columns, whereas the electrodes belonging to the other set are arranged and connected in rows. Preferably, the columns and rows are placed to form an orthogonal matrix in which the connected electrodes of each column and row are linked to a contact placed at the ends thereof. Thus, easy access may be gained to any desired cell in the matrix by application of a potential across the contacts at the ends of the appropriate column and row.

Figure 1:
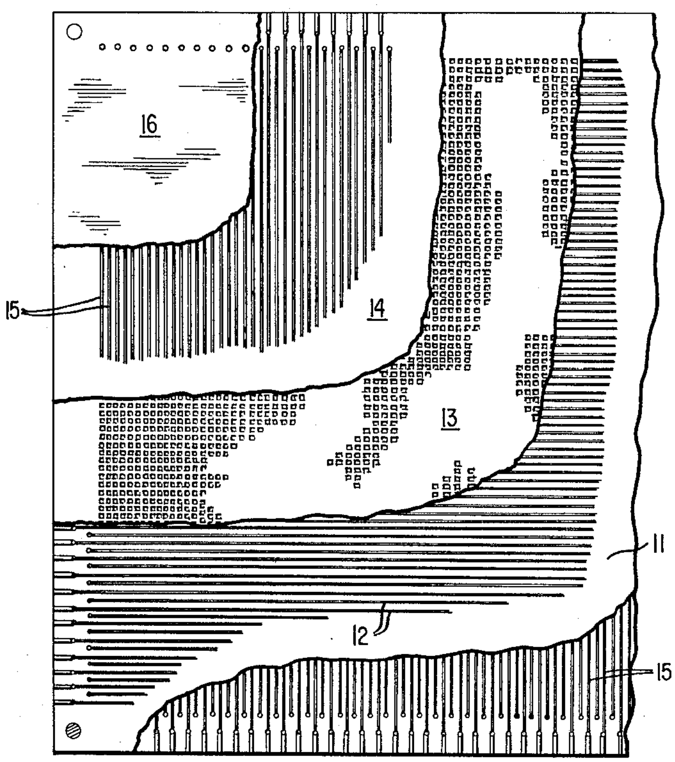
FIG. 1 is a plan view of a memory device according to the invention.
Figure 2:
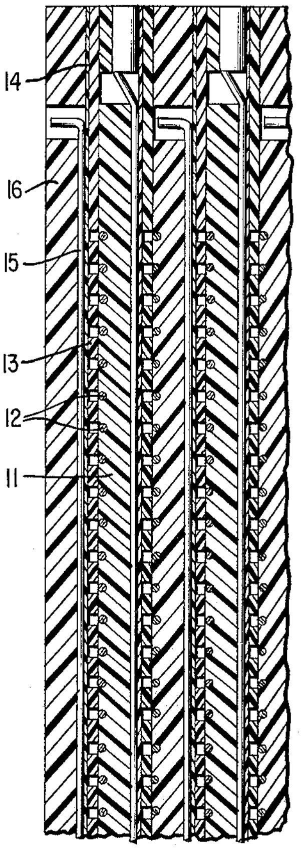
FIG. 2 is a fragmentary, enlarged, vertical section through the device of FIG. 1.
Figure 3:
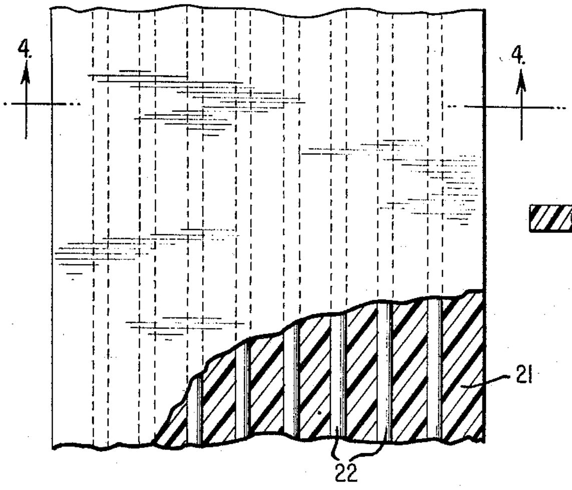
FIG. 3 is a fragmentary top plan view of a dielectric plate having conductors embedded therein.
Figure 4:
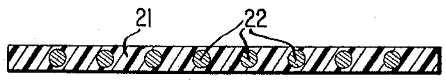
FIG. 4 is a sectional view taken along the line 4—4 of FIG. 7.

Referring more particularly to the drawings, FIGS. 1 and 2 illustrate a preferred embodiment of the invention. In this construction, the electrodes of the individual spark discharge cell are formed by conductors disposed on opposite parallel surfaces of an insulating medium, or on one side of plates laid one on the other. Preferably, the conductors are crossed to form individual cells between their spatial crossings. Preferably, also, the conductors on one side are parallel and equally spaced. The insulating plates are thus arranged so that their conductors are orthogonal.

A voltage impulse set up between a conductor of each of the plates causes the disruptive discharge through the insulating medium or through another dielectric previously perforated by an excess voltage at said intersecting point. This construction is exemplified by the conductors 12 mounted in spaced parallel relation on insulating plates 11. Plates 11 are stacked with the conductors 12 of one at right angle to the conductors 15 of the next plate. Adjacent plates 11 are separated by an insulating grid 13 whose openings define individual cell boundaries. Lastly, a dielectric 14 is interposed between the conductors 15 and the grid 13. The outermost conductors 15 of the stack are mounted on an external insulating support plate 16.

The successive layers of conductors form a block comprising a very large number of intersection points or cells and thus comprise a memory device of large capacity. The dielectric 14 is adapted to be punctured by an excess voltage applied to selected conductors 12 and 15. The openings of the grid 13 restrict the rupture sparks and localize them at desired points. The grid also prevents a weaker reading voltage from inducing a spark which will travel a longer path than directly from conductor 12 to conductor 15 through a grid opening at the desired reading location or cell. Alternate conductors of each layer are desirably terminated in sockets at opposite sides of the layer to permit space for plug connections to be made to the individual conductors. It should be apparent from examination of FIG. 1 that ready access of a recording or reading potential may be had to any one of the individual cells in the matrix by selecting the row and column whose spatial intersection is located at the cell in question.

Figure 5:
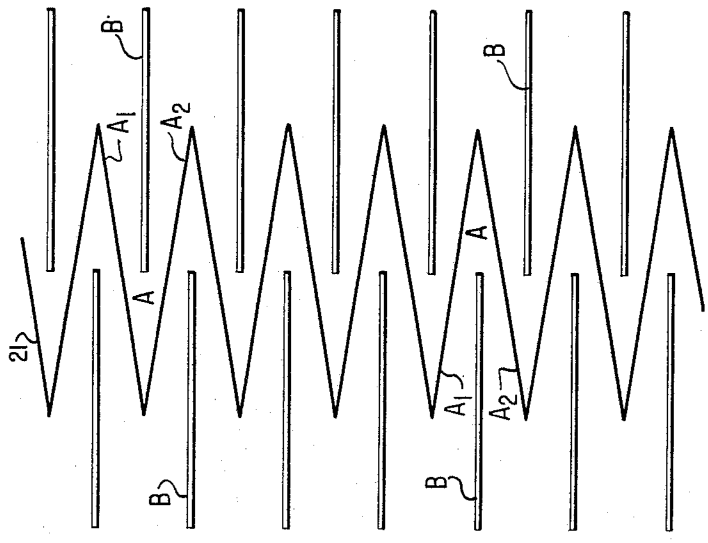
FIG. 5 is a diagrammatic side elevational view of a modified memory device in process of assembly and utilizing the dielectric sheet of FIGS. 3 and 4 folded in accordion pleats.

Another embodiment of the invention is illustrated in FIGS. 3–7. Here, the electric memory device is formed from a dielectric plate 21 having spaced parallel conductors 22 embedded therein so as to retain a small thickness of dielectric on each side of the conductors. This small thickness is subject to puncture by an excess recording voltage. The conductors 22 are preferably aligned parallel to the longitudinal axis of the dielectric plate 21 which is then accordion pleated or folded, as shown in FIG. 5, along parallel lines to the same axis. This reduces the space required in the memory matrix and facilitates the linking of conductors as will be shortly described.

Figure 6:
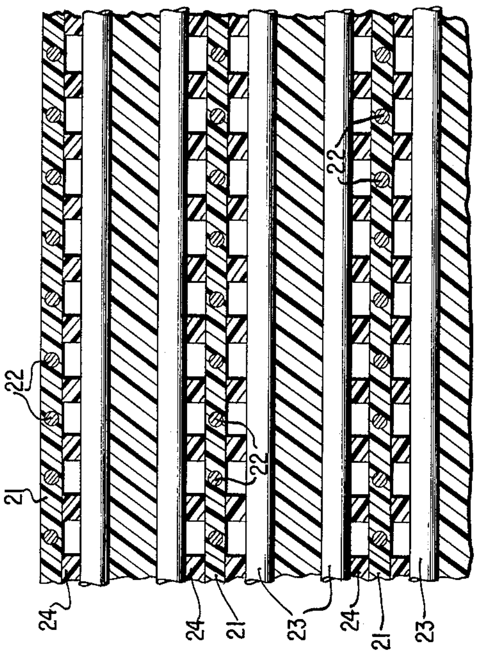
FIG. 6 is a partial view in section of an accordion-pleated dielectric containing plates between its pleats, as shown in FIG. 5, taken along a section plane parallel to the lines of the pleating of the dielectric.
Figure 7:
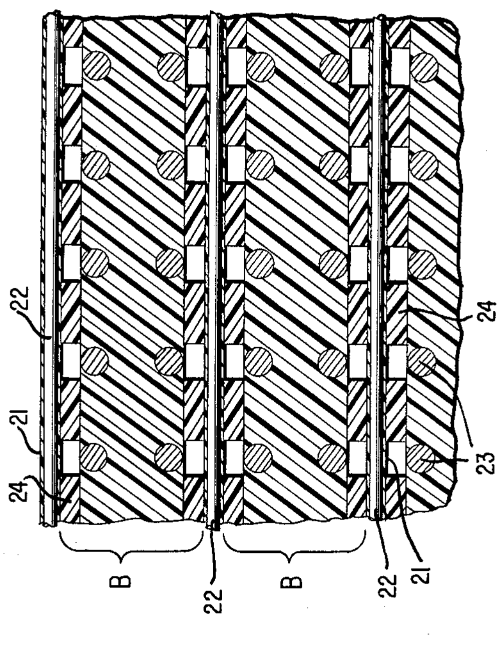
FIG. 7 is a sectional right-hand view of FIG. 6.

In FIG. 5, the pleats are referenced A. The interior pleat sides $A_1$ and $A_2$ fall adjacent dielectric plates B which are interleaved. FIG. 5 shows the positioning of the plates B as they are being inserted and before they are fully inserted, and the pleats are folded flat. Each plate B consists, as shown in FIGS. 6 and 7, of two layers of external conductors 23 and two insulating grids 24 arranged so as to interpose between the sides $A_1$, $A_2$ of the dielectric and the corresponding layers of the conductors 23 of the plate B.

The grids 24 provide openings or recesses which surround the intersection points of the conductors 22 embedded in the dielectric 21 and each of the layers of the conductors 23 which are at right angles thereto. The grids, during the "reading" operation, i.e., when a voltage impulse is set up in two conductors 22 and 23, compel the spark establishing the circuit to take the shortest course and, especially, when the dielectric 21 has not been previously perforated at this intersection point. They do allow the spark to seek a longer path by perforation of the dielectric at an adjacent intersection point. The conductor 22 embedded in the dielectric 21 enables, by co-operation with the plate B, the perforation of the dielectric on both of its faces, thus reducing the number of layers of conductors required in the memory device as well as the space required.

It is quite obvious that the invention is not restricted to the specific embodiments thus far described. Other variations will be readily apparent. For example, each cell may be enclosed in a small hermetically sealed chamber in which two electrodes terminate. A recording potential applied to the electrodes may be utilized to cause a current between the electrodes which will ozonize air dielectric contained in the chamber. A weaker reading potential will then cause a spark between the electrodes. The effacing of the memory in such a cell can be simply effected by including means for driving out the ozonized air in the chamber. It is also possible, apart from a closed chamber, to maintain a current of suitable intensity so that free air becomes ozonized between the electrodes subjected to such current.

Although certain specific embodiments of the invention have been shown and described, it is obvious that many modifications thereof are possible. The invention, therefore, is not to be restricted except insofar as is necessitated by the prior art and by the spirit of the appended claims.

What I claim is:

1. An electric memory device formed as a matrix of spark discharge cells comprising a fixed sheet of dielectric material normally impervious to a low readout potential, a layer of parallel conductors embedded in said dielectric sheet, a second layer of parallel conductors on one side of said dielectric sheet separated therefrom by a grid of insulating material whose openings are aligned with both layers of conductors, the conductors of one layer crossing those of the other layer to form a plurality of spark discharge cells at points in the dielectric sheet corresponding to the intersection points of said conductors and surrounded by the walls of said grid openings, means for applying a higher recording potential through said conductors to selected cells to pierce the dielectric, and means for applying a lower readout potential to the cells of said matrix whereby those cells having previously received a recording potential will discharge a spark between said conductors at their points of intersection and across the piercings of said dielectric sheet to indicate the first information of a binary code, the second information of said binary code being the non-passage of a reading current across those cells to which the recording potential has not been applied.

2. An electric memory device according to claim 1 wherein said dielectric sheet is formed with accordion pleats and said second layer of conductors are placed in the folds of said pleats.

References Cited in the file of this patent

UNITED STATES PATENTS

| | | |
|---|---|---|
| 1,549,475 | Finch | Aug. 11, 1925 |
| 2,303,472 | Johnston | Dec. 1, 1942 |
| 2,610,102 | Gitzendanner | Sept. 9, 1952 |
| 2,688,739 | Hofgaard | Sept. 7, 1954 |
| 2,689,338 | Singleton | Sept. 14, 1954 |
| 2,709,042 | Couffignal | May 24, 1955 |
| 2,847,615 | Engelbart | Aug. 12, 1958 |
| 2,869,965 | Willard | Jan. 20, 1959 |
| 2,933,648 | Bentley | Apr. 19, 1960 |